US011407306B2

(12) United States Patent
Otsura et al.

(10) Patent No.: US 11,407,306 B2
(45) Date of Patent: Aug. 9, 2022

(54) FUEL CELL VEHICLE

(71) Applicant: TOYOTA JIDOSHA KABUSHIKI KAISHA, Toyota (JP)

(72) Inventors: Takanori Otsura, Nagoya (JP); Hiroya Nakaji, Toyota (JP); Kazuhiro Higashiyama, Toyota (JP); Atsushi Fujimatsu, Toyota (JP); Koki Matsuno, Okazaki (JP); Tsutomu Kumazaki, Nakatsugawa (JP); Itaru Kuwahara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 60 days.

(21) Appl. No.: 17/158,359

(22) Filed: Jan. 26, 2021

(65) Prior Publication Data
US 2021/0252971 A1 Aug. 19, 2021

(30) Foreign Application Priority Data
Feb. 13, 2020 (JP) .............................. JP2020-022221

(51) Int. Cl.
*B60K 15/07* (2006.01)
*B60S 5/00* (2006.01)
*B60K 15/03* (2006.01)

(52) U.S. Cl.
CPC ............... *B60K 15/07* (2013.01); *B60S 5/00* (2013.01); *B60K 2015/03315* (2013.01); *B60Y 2400/202* (2013.01)

(58) Field of Classification Search
CPC . B60K 15/07; B60K 2015/03315; B60S 5/00; B60Y 2400/202
USPC ........................................................ 280/834
See application file for complete search history.

(56) References Cited

U.S. PATENT DOCUMENTS

| 6,974,156 | B2* | 12/2005 | Kosuge ................. F17C 11/005 280/834 |
| 7,966,945 | B1* | 6/2011 | Miller ....................... B61C 7/04 105/49 |
| 2005/0045391 | A1 | 3/2005 | Kubusch et al. |
| 2008/0156809 | A1 | 7/2008 | Mizuno et al. |
| 2019/0047409 | A1* | 2/2019 | Kataoka .................... F17C 1/14 |

FOREIGN PATENT DOCUMENTS

| JP | 2005033996 A | 2/2005 |
| JP | 2006188169 A | 7/2006 |

* cited by examiner

*Primary Examiner* — Mahmoud Gimie
(74) *Attorney, Agent, or Firm* — Dickinson Wright, PLLC

(57) ABSTRACT

A fuel cell vehicle includes a fuel tank module that accommodates a fuel gas, and a rail arranged along a vehicle-width direction of the fuel cell vehicle in a floor part of the fuel cell vehicle, in which the fuel tank module includes a casing that accommodates a fuel tank accommodating the fuel gas, a block unit arranged in a bottom surface of the casing and configured to be attachable to and detachable from the rail and movable along the rail, and a fixation unit that can fix the block unit to the rail and release fixation of the block unit to the rail.

5 Claims, 15 Drawing Sheets

FUEL CELL VEHICLE

CROSS REFERENCE TO RELATED APPLICATIONS

The present application claims the priority based on Japanese Patent Application No. 2020-022221 filed on Feb. 13, 2020, the disclosure of which is hereby incorporated by reference in its entirety.

BACKGROUND

Field

The present disclosure relates to a fuel cell vehicle.

Related Art

There are conventional fuel cell vehicles in which a fuel tank can be put in and taken out (for example, Unexamined Patent Application No. 2005-33996). In the technology in Unexamined Patent Application No. 2005-33996, when a fuel tank becomes empty, the fuel tank is taken out from a fuel cell vehicle, for example, by means of a pallet truck, a forklift. Then, a fuel tank filled with fuel gas is mounted to the fuel cell vehicle.

In a fuel cell vehicle configured such that a fuel tank can be put in and taken out with respect to the vehicle, a structure fixing the fuel tank to the vehicle is configured as follows: the structure fixing the fuel tank is configured so that the structure can fix the fuel tank to a vehicle body and release the fuel tank from the vehicle body. On the other hand, since the fuel cell vehicle performs acceleration and deceleration, a load is applied to the structure fixing the fuel tank to the vehicle. In such a fuel cell vehicle configured such that the fuel tank can be put in and taken out with respect to the vehicle, there is a room for improvement in the structure fixing the fuel tank to the vehicle.

SUMMARY

According to an aspect of the present disclosure, a fuel cell vehicle is provided. The fuel cell vehicle includes a fuel tank module that accommodates fuel gas, and a rail arranged along a vehicle-width direction of the fuel cell vehicle in a floor part of the fuel cell vehicle, in which the fuel tank module includes: a casing that accommodates a fuel tank accommodating the fuel gas; a block unit arranged in a bottom surface of the casing and configured to be attachable to and detachable from the rail and movable along the rail; and a fixation unit that is configured to fix the block unit to the rail and release fixation of the block unit to the rail.

DETAILED DESCRIPTION

A1. First Embodiment

Figure 1:
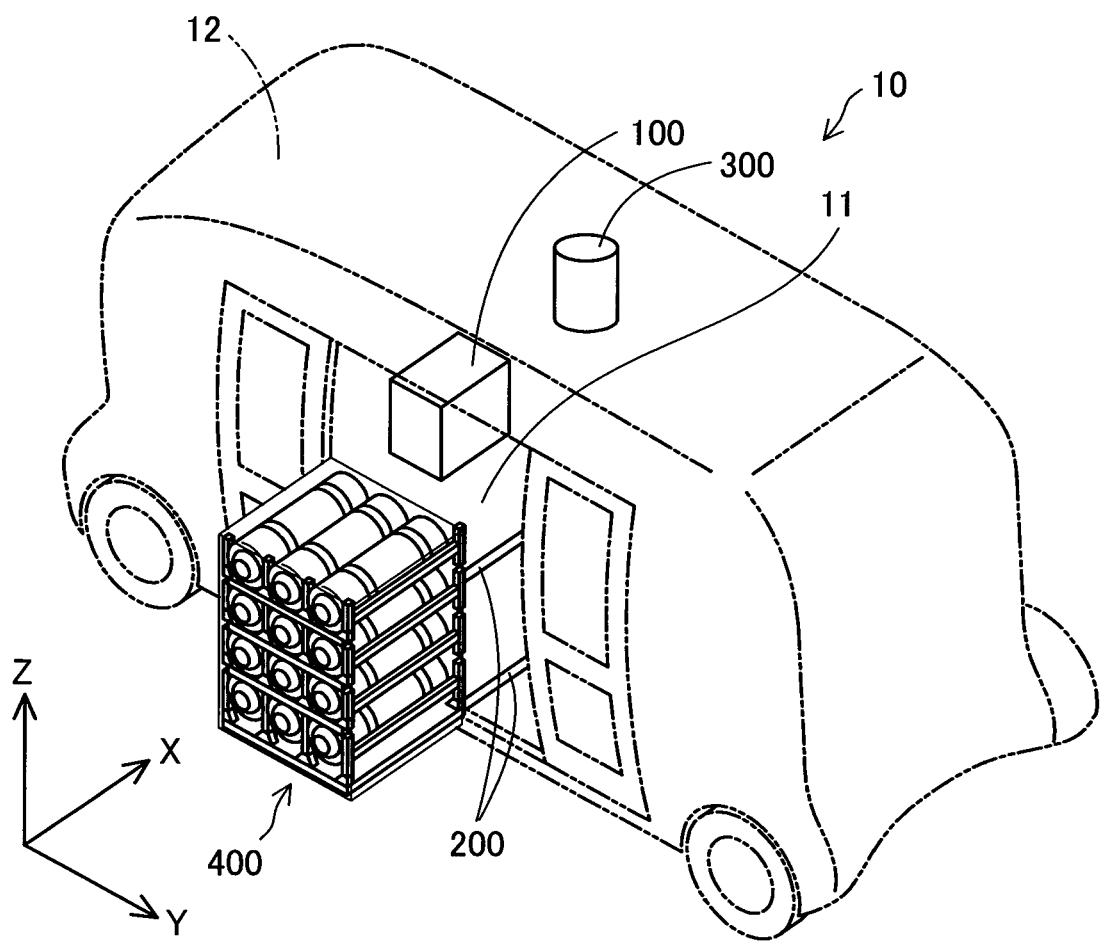
FIG. 1 is a schematic appearance view of a fuel cell vehicle of a first embodiment.

FIG. 1 is a schematic appearance view of a fuel cell vehicle 10 of a first embodiment. FIG. 1 shows a state where a fuel tank module 400 is not accommodated in the fuel cell vehicle 10. Note that, in order to facilitate understanding, in FIG. 1, a part of a configuration of the fuel cell vehicle 10 is indicated by a long dashed double-dotted line, and an internal structure of the fuel cell vehicle 10 is indicated by a solid line. FIG. 1 illustrates an X axis direction, a Y axis direction, and a Z axis direction as three directions orthogonal to each other. The X axis direction is an attaching and detaching direction of the fuel tank module 400, and is a movement direction of the fuel tank module 400. Note that the X axis direction is also a vehicle-width direction of the fuel cell vehicle 10. The Y axis direction is a longitudinal direction of the fuel cell vehicle 10. The Z axis direction is a vertical direction. When the fuel tank module 400 is accommodated in the fuel cell vehicle 10, the fuel tank module 400 moves in a positive direction of the X axis. When the fuel tank module 400 is taken out from the fuel cell vehicle 10, the fuel tank module 400 moves in a negative direction of the X axis.

The fuel cell vehicle 10 includes a fuel cell unit 100, two rails 200, a duct 300, and a fuel tank module 400.

The fuel cell unit 100 is a unit including a fuel cell (not shown) and a device for driving the fuel cell. In the present embodiment, the fuel cell unit 100 is arranged in a negative direction side of the Y axis from the fuel tank module 400 in a state of being mounted to the fuel cell vehicle 10. Note that the fuel cell unit 100 may be installed in a positive direction side of the Y axis from the fuel tank module 400, and the installation position in the fuel cell vehicle 10 is not limited.

In the present embodiment, the fuel cell is a polymer electrolyte fuel cell, and is configured as a fuel cell stack in which a plurality of single cells are stacked. The fuel cell stack generates power by means of the fuel gas accommodated in the fuel tank module 400 and air as an oxidizing gas supplied from the outside. In the present embodiment, the fuel gas is a hydrogen gas. Note that the fuel gas may be a natural gas, for example. By means of the power generation of the fuel cell stack, power as a driving force of the fuel cell vehicle 10 is obtained. Each single cell includes a membrane electrode assembly in which electrodes are arranged on both sides of an electrolyte membrane, and is an element capable of generating power individually. Note that, as the fuel cell, various types of fuel cells, such as a solid oxide fuel cell, may be adopted. Examples of the device for driving the fuel cell include a case for accommodating the fuel cell, a frame supporting the fuel cell, an air compressor for supplying air to the fuel cell, a gas-liquid separator that separates liquid from a discharged gas of the fuel cell, a control device that controls those components, sensors, a valve, and a piping connection member.

When the fuel tank module 400 is accommodated in the fuel cell vehicle 10, the two rails 200 support the fuel tank module 400, and guide the fuel tank module 400 to the inside of the fuel cell vehicle 10. Each rail 200 is arranged along the vehicle-width direction on the floor part 11 of the fuel cell vehicle 10. More specifically, the rail 200 is arranged on a surface of the floor part 11 of the fuel cell vehicle 10 in a positive direction side of the Z axis. The two rails 200 are provided with an interval in the longitudinal direction of the fuel cell vehicle 10. A block unit 430 of the fuel tank module 400 is attachable to and detachable from each of the rails 200. When the block unit 430 is connected to the rail 200, the fuel tank module 400 becomes movable along the rails 200 on the inside of the fuel cell vehicle 10. Connection between the rails 200 and the fuel tank module 400 will be described later.

Figure 2:
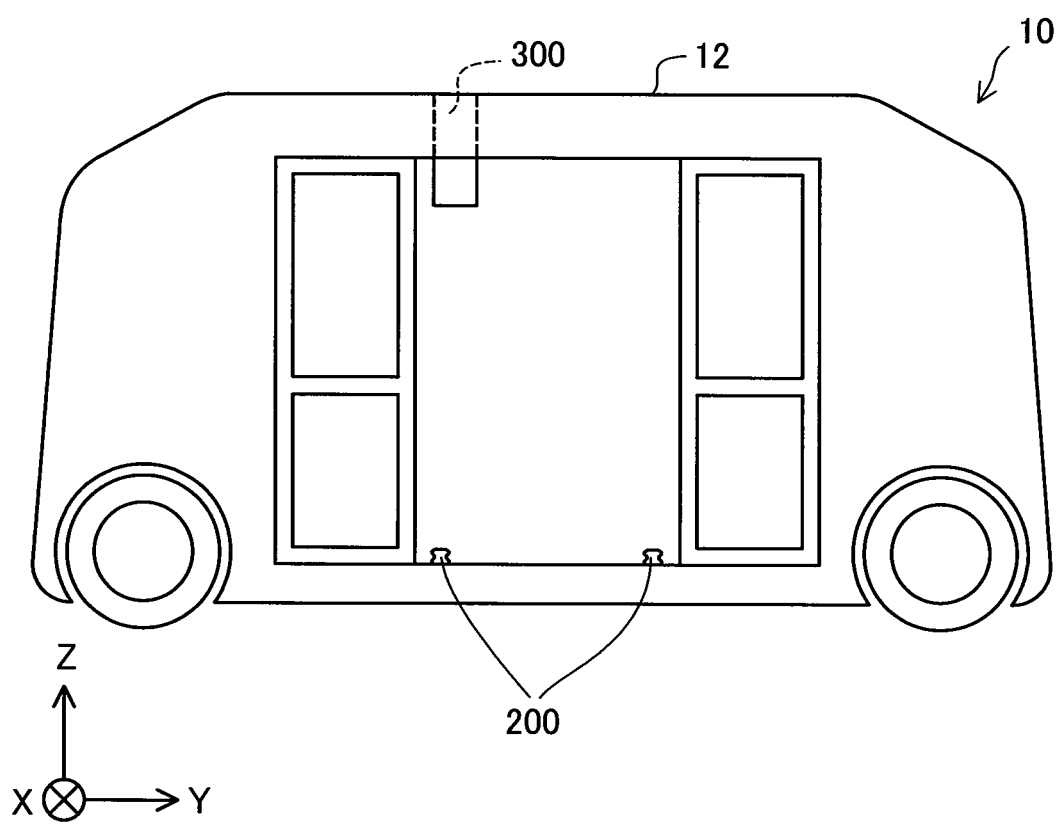
FIG. 2 is a view of the fuel cell vehicle of the first embodiment viewed in a positive direction of an X axis.

FIG. 2 is a view of the fuel cell vehicle 10 of the first embodiment viewed in the positive direction of the X axis. In FIG. 2, the fuel tank module 400 is omitted. The duct 300 communicates the space accommodating the fuel tank 410 and the outside of the fuel cell vehicle 10. By means of the duct 300, hydrogen gas in the fuel tank module 400 is discharged to the outside of the fuel cell vehicle 10. The duct 300 has a hollow inside, and has a cylindrical shape with both ends opened. The duct 300 is provided on a vehicle upper surface 12 of the fuel cell vehicle 10. More specifically, as shown in FIG. 1, the duct 300 is provided so as to extend through the vehicle upper surface 12 on the negative direction side of the Y axis and the positive direction side of the X axis from a substantial center of the fuel cell vehicle 10.

Figure 3:
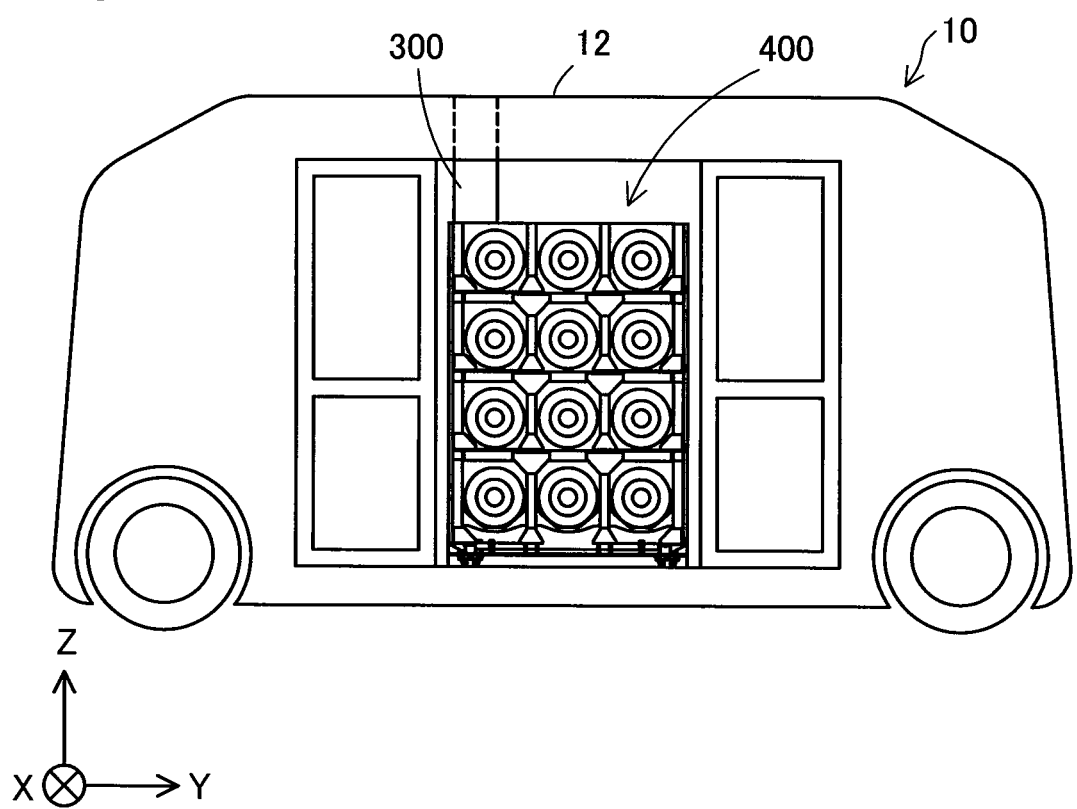
FIG. 3 is a view for explaining a state where a fuel tank module is accommodated in the fuel cell vehicle.

FIG. 3 is a view for explaining a state where the fuel tank module 400 is accommodated in the fuel cell vehicle 10. As shown in FIG. 3, in the state where the fuel tank module 400 is accommodated in the fuel cell vehicle 10, the opening of the duct 300 on the negative direction side of the Z axis connects to a hole (not shown) provided on the positive direction side of the Z axis in the fuel tank module 400. Therefore, the outside of the fuel cell vehicle 10 communicates with the internal space of the fuel tank module 400. The gas in the fuel tank module 400 is discharged from the opening (not shown) of the duct on the positive direction side of the Z axis through the duct 300. Note that, a valve may be provided in the opening of the duct on the positive direction side of the Z axis. In such an aspect, the hydrogen gas may be discharged, when the valve opens.

Figure 4:
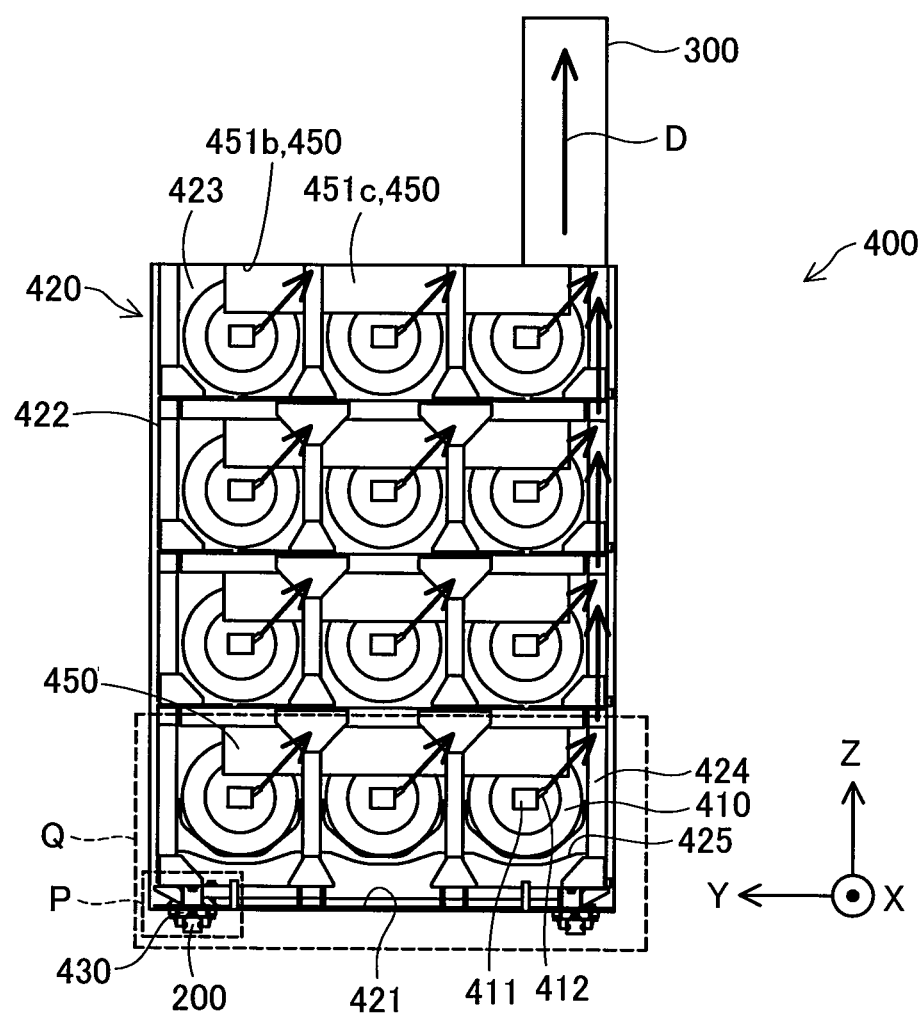
FIG. 4 is a view of the fuel tank module in FIG. 3 viewed in a negative direction of the X axis.
Figure 5:
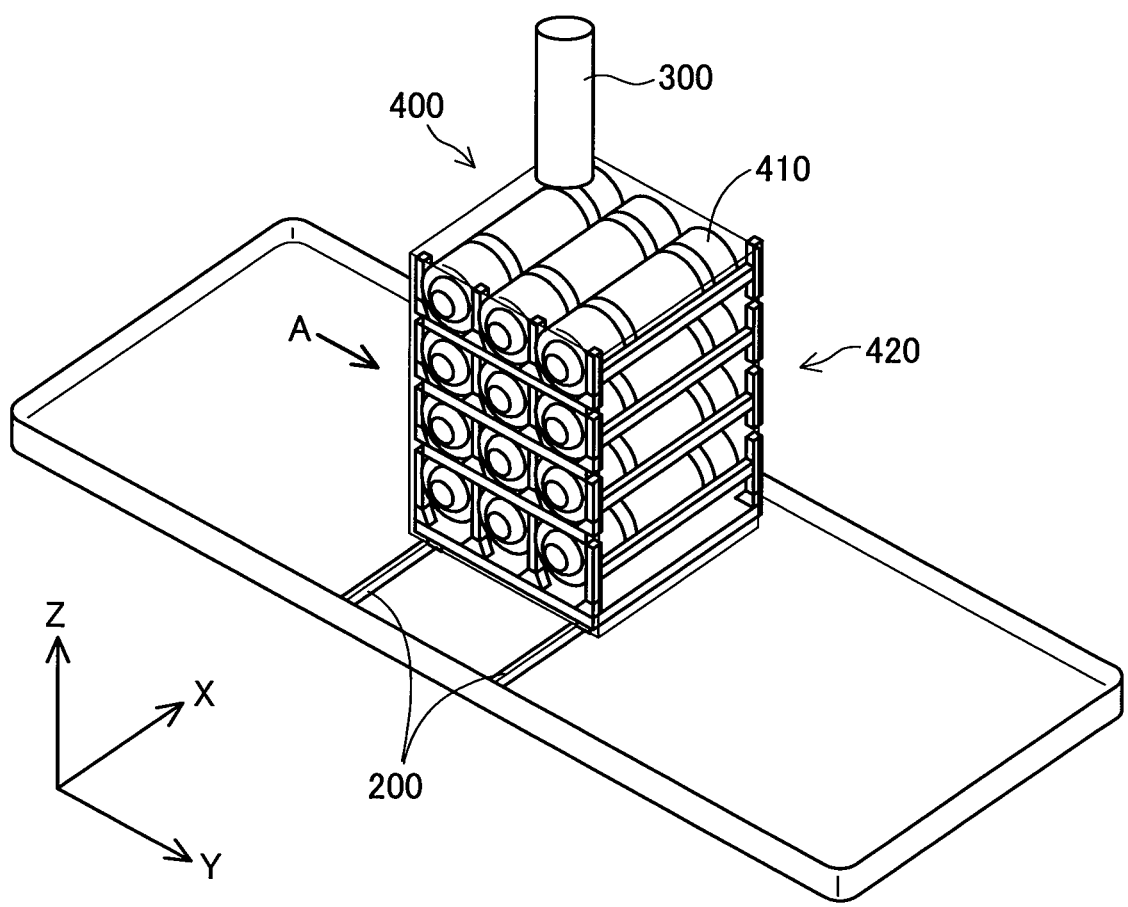
FIG. 5 is a view for explaining a state wherein the fuel tank module is accommodated in the fuel cell vehicle.

FIG. 4 is a view of the fuel tank module 400 of FIG. 3 viewed in the negative direction of the X axis. FIG. 5 is a view for explaining a state where the fuel tank module 400 is accommodated in the fuel cell vehicle 10. Note that, in order to facilitate understanding, a part of the configuration of the fuel cell vehicle 10 is omitted in FIGS. 4 and 5. The fuel tank module 400 accommodates a hydrogen gas. As shown in FIG. 4, the fuel tank module 400 includes twelve fuel tanks 410, a casing 420, and a block unit 430.

The fuel tank 410 accommodates a hydrogen gas to be supplied to the fuel cell stack. In the present embodiment, as shown in FIG. 5, the fuel tank 410 has a cylindrical shape having the X axis direction as a longitudinal direction. The respective fuel tanks 410 each have the same structure. For example, the fuel tank 410 may be a tank made of a resin having a fiber reinforced plastic (FRP) layer as a reinforcement layer on the outer surface of the resin liner. In such an aspect, the FRP layer may be made by winding fibers containing a thermosetting resin on the outer surface of the resin liner. For example, the FRP layer may include a layer including a carbon fiber reinforced plastic (CFRP). Such a FRP layer may be formed by the filament winding Note that each of the fuel tanks 410 may have different diameter, length, and the like.

Figure 6:
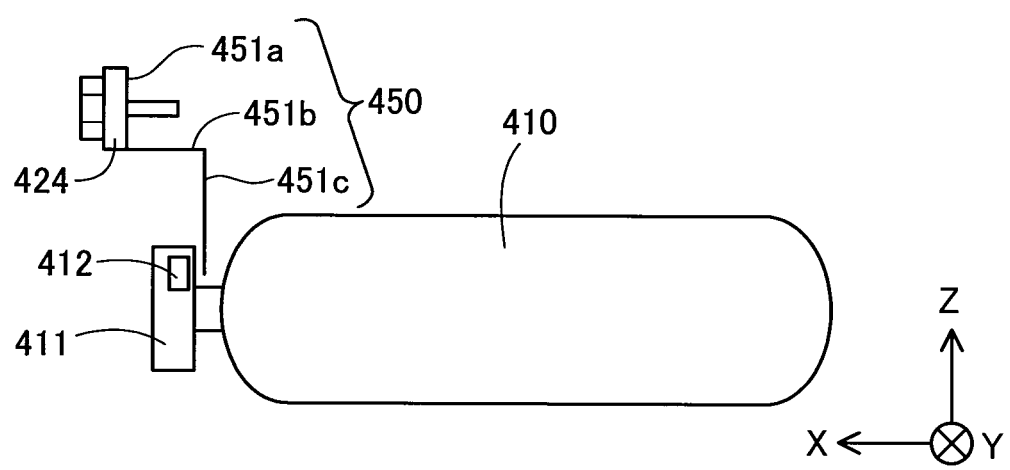
FIG. 6 is a view of a fuel tank viewed in an arrow A direction of FIG. 5.

FIG. 6 is a view of the fuel tank 410 viewed in an arrow A direction of FIG. 5. The fuel tank 410 includes a cap part 411. As shown in FIG. 6, the fuel tank 410 includes a cylindrical part, and substantially semispherical-shaped dome parts on both ends of the cylindrical part. The cap part 411 is provided in an end portion in the longitudinal direction of the fuel tank 410. In the present embodiment, the cap part 411 is provided in an end portion on the positive direction side of the X axis direction. The inside of the cap part 411 is provided with a filling flow path, a discharge flow path, a valve mechanism, and a safety valve 412. When the fuel tank 410 is filled with the hydrogen gas, the hydrogen gas flows through filling flow path. The hydrogen gas flows through the discharge flow path, when the hydrogen gas is discharged from the fuel tank 410 to the outside of the fuel tank 410. The valve mechanism adjusts the flow state of these flow paths. Note that, in FIGS. 1, 3 to 6, and 11 to 13, piping for the hydrogen gas connected to the valve mechanism described above is omitted.

The safety valve 412 is a valve mechanism that opens when a temperature is greater than a predetermined temperature to discharge the hydrogen gas in the fuel tank 410 to the outside. The predetermined temperature may be an arbitrary temperature in a range from 80 degrees C. to 90 degrees C., for example. The safety valve 412 is attached in a direction as below (see FIG. 4).

That is, the safety valve 412 is arranged such that, in a state where the fuel tank module 400 is accommodated in the fuel cell vehicle 10, when the safety valve 412 opens, the direction in which the hydrogen gas in the fuel tank 410 is discharged via the safety valve 412 is the direction of the duct 300 with respect to the safety valve 412. Specifically, the safety valve 412 is arranged such that the safety valve 412 discharges the hydrogen gas within the range of the negative direction of the Y axis and the positive direction of the Z axis. Here, "is the direction of the duct 300 with respect to the safety valve 412" refers to being included in a cone-shaped range of 90 degrees, having a hydrogen gas discharge port of the safety valve 412 as a vertex and a direction connecting the safety valve 412 and an entrance of the duct 300 as a center axis. It is preferably within 60 degrees, more preferably within 45 degrees, within 30 degrees is more preferable.

In the present embodiment, as the safety valve 412, a fusible plug type safety valve 412 is used. When the safety valve 412 is actuated, hydrogen gas as a fuel gas having a specific gravity less than that of air is quickly discharged to the outside of the fuel cell vehicle 10 through the duct 300.

The casing 420 accommodates twelve fuel tanks 410 in an internal space thereof. As shown in FIGS. 4 and 5, the casing 420 includes a hollow box body having a substantially rectangular parallelepiped shape. An upper plate forming the positive direction side of the Z axis and four side plates of the casing 420 are made of, for example, an ABS resin, a fiber reinforced plastic, or the like. A bottom plate 421 that is a plate of the casing 420 on the negative direction side of the Z axis is formed of a metal member such as a stainless steel or an aluminum, for example. As shown in FIG. 4, the casing 420 includes an accommodation shelf 422 and a fuel gas guide 450 in the inside of the casing 420. The accommodation shelf 422 defines the accommodation space 423 which is a space on the inside of the casing 420. As shown in FIG. 5, the accommodation shelf 422 includes a frame member 424 and a placement part 425.

A plurality of frame members 424 are coupled so that an accommodation space 423 is defined. The frame member 424 may be a metal member made of an iron, for example. As each frame member 424, for example, a bar member formed to be a solid polygonal prism or column, or a pipe-shape member formed to be a hollow prism or column may be used.

When the fuel tanks 410 are mounted, the fuel tanks 410 are arranged on the upper side of the placement part 425 in the Z axis direction. The fuel tanks 410 are accommodated in the accommodation space 423 in a state where each of the longitudinal directions of the fuel tanks 410 are parallel to each other due to a fixation wire (not shown) surrounding the outer periphery of the frame member 424, the placement part 425, and the fuel tank 410. By such accommodation of the fuel tank 410, the position of the safety valve 412 is fixed. Although the placement part 425 and the fuel tank 410 are not brought into contact with each other in FIG. 4, they may be brought into contact with each other. In FIG. 4, the placement part 425 on the positive side of the Z axis from the first stage is omitted.

As shown in FIGS. 4 and 5, the fuel tank 410 is arranged in the casing 420 such that a group of fuel tanks 410 arrayed along the Y axis direction are stacked in plural along the Z axis direction, when viewed in the X axis direction. In the present embodiment, three fuel tanks 410 are arrayed and arranged in the Y axis direction, and four fuel tanks 410 are stacked in the Z axis direction, so that twelve fuel tanks 410 in total are accommodated in the casing 420. Note that the number of fuel tanks 410 arrayed in the Y axis direction and the Z axis direction is not limited to twelve, and may be an arbitrary number such as one or two, for example. The fuel gas guide 450 will be described later.

Figure 7:
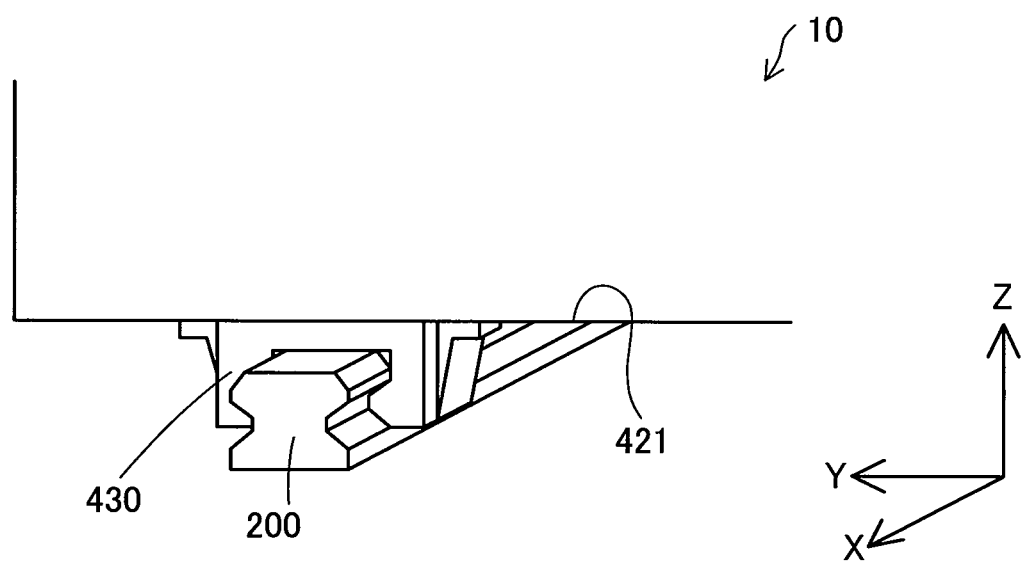
FIG. 7 is a view for explaining a state wherein a block unit is connected to a rail.

FIG. 7 is a view for explaining a state where the block unit 430 connects to the rail 200. FIG. 7 is an enlarged view of the inside of a broken frame P of FIG. 4. Note that, in FIG. 7, the fixation unit and a part of the fuel cell vehicle 10 are omitted. The block unit 430 connects to the rail 200 and moves on the rail 200. The block unit 430 is arranged on the bottom surface 421 of the casing 420. More specifically, the block unit 430 is provided on a surface on the negative direction side of the Z axis of the bottom surface 421. In the present embodiment, the block unit 430 and the rail 200 are configured with an LM guide (registered trademark). Note that, as the block unit 430 and the rail 200, a rail extending along the X axis direction and a block unit that slides on the rail other than the LM guide may be used.

When the fuel tank module 400 is mounted to the fuel cell vehicle 10, as shown in FIG. 7, the block unit 430 is connected to the rail 200 extending in the vehicle-width direction of the fuel cell vehicle 10. Next, the block unit 430 slides on the positive direction of the X axis on the rail 200. Thereby, as shown in FIGS. 3 and 5, the fuel tank module 400 is accommodated on the inside of the fuel cell vehicle 10. By sliding the block unit 430 in the negative direction of the X axis, the fuel tank module 400 can be taken out from the fuel cell vehicle 10.

Figure 8:
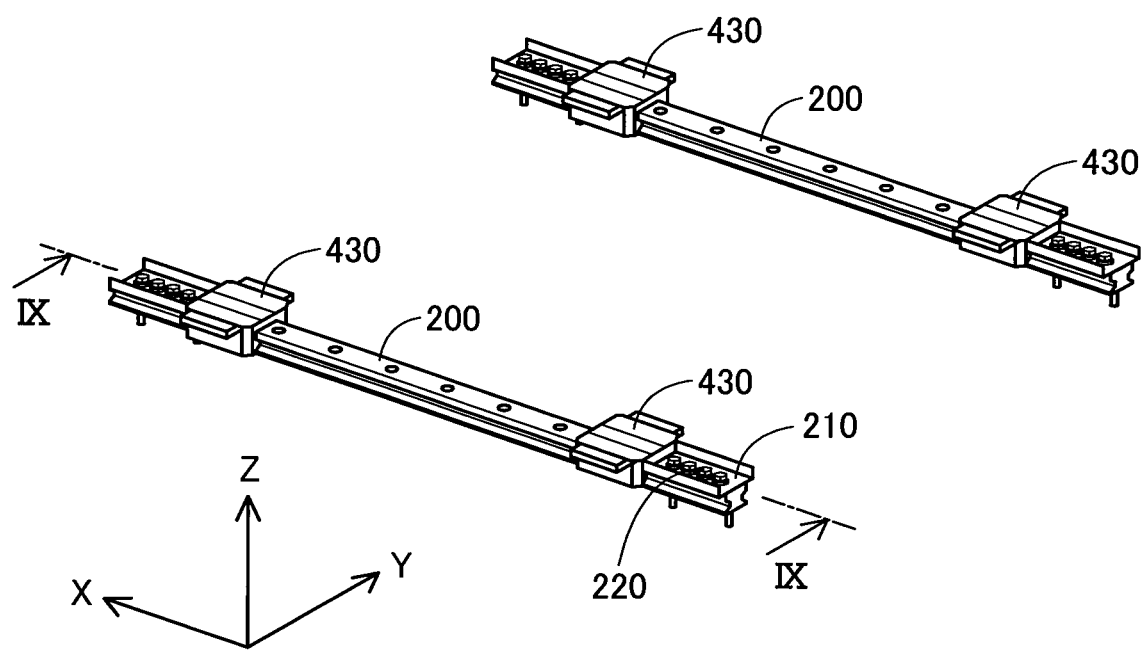
FIG. 8 is a view for explaining the rail and the block unit in detail.

FIG. 8 is a view for explaining the rail 200 and the block unit 430 in detail. In FIG. 8, components of the fuel cell vehicle 10 other than the rail 200, the block unit 430, and a bracket 210 and a bolt 220, are omitted. As shown in FIG. 8, in the present embodiment, four block units 430 are provided on the bottom surface 421 of the casing 420. Specifically, two block units 430 are provided with an interval in the X axis direction for each rail 200.

Figure 9:
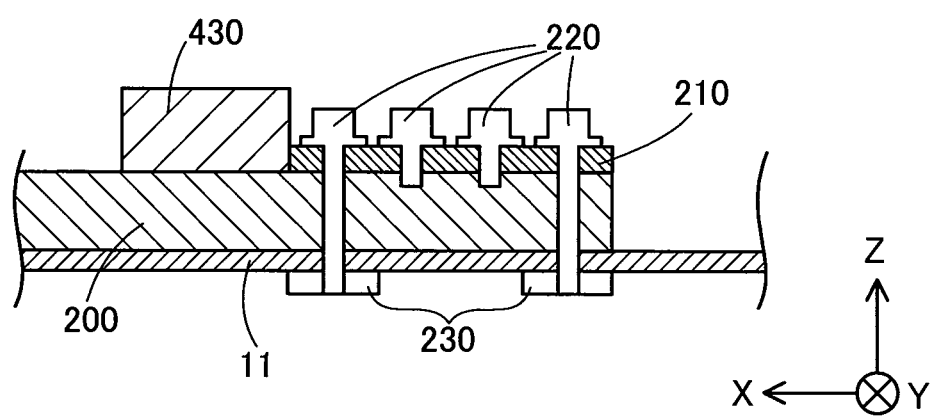
FIG. 9 is a view representing a part of an IX-IX end surface of FIG. 8.

FIG. 9 is a view representing a part of an IX-IX end surface of FIG. 8. In FIG. 9, the floor part 11 and a nut 230 that are omitted in FIG. 8 are illustrated. As shown in FIG. 9, the block unit 430 is fixed to the rail 200 using the bracket 210, the bolt 220, and the nut 230. Specifically, the bracket 210 fixed to the block unit 430 is fixed to the rail 200 by the bolt 220. As a result, as shown in FIG. 8, movement of two block units 430 connected to one rail 200 from both sides of the X axis direction along the rail 200 is regulated. Therefore, the block unit 430 is fixed to the rail 200. The block unit 430 and the bracket 210 may be fixed by a bolt or by welding or bonding. Although the bracket 210 is fixed to the rail 200 with four bolts 220 in the present embodiment, one bolt 220 or five bolts 220 may be used. The bracket 210, the bolt 220, and the nut 230 function as fixation units for fixing the block unit 430 to the rail 200. With the fixation unit, fixation of the block unit 430 to the rail 200 can be released by detaching the bolt 220 from the rail 200.

Therefore, the effects below can be exhibited. First, the fuel tank module 400 can move on the rail 200 arranged along the vehicle-width direction of the fuel cell vehicle 10. Furthermore, by detaching the fuel tank module 400 from the rail 200, the fuel tank module 400 can be changed easily.

In traveling of the fuel cell vehicle 10, the fuel tank module 400 can be fixed to the floor part 11 of the fuel cell vehicle 10 via the rail 200 by the fixation unit in advance. Therefore, movement of the fuel tank module 400 along the rail 200 in the fuel cell vehicle 10 can be prevented at the time of acceleration and deceleration of the fuel cell vehicle 10. Furthermore, the rail 200 is provided along the vehicle-width direction of the fuel cell vehicle 10. Therefore, at the time of acceleration and deceleration of the fuel cell vehicle 10, the fuel tank module 400 is less susceptible to inertial force in a direction along the rail 200. Therefore, as compared to a mode where the rail 200 runs along the Y axis direction that is a front and rear direction of the fuel cell vehicle 10, the fixation unit can be configured with a simple structure.

Figure 10:
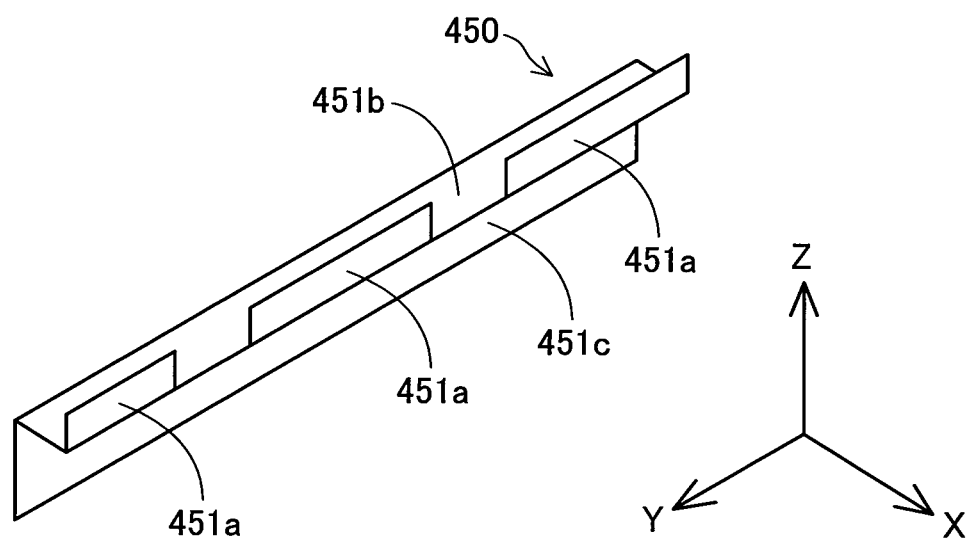
FIG. 10 is a perspective view for explaining a fuel gas guide.
Figure 11:
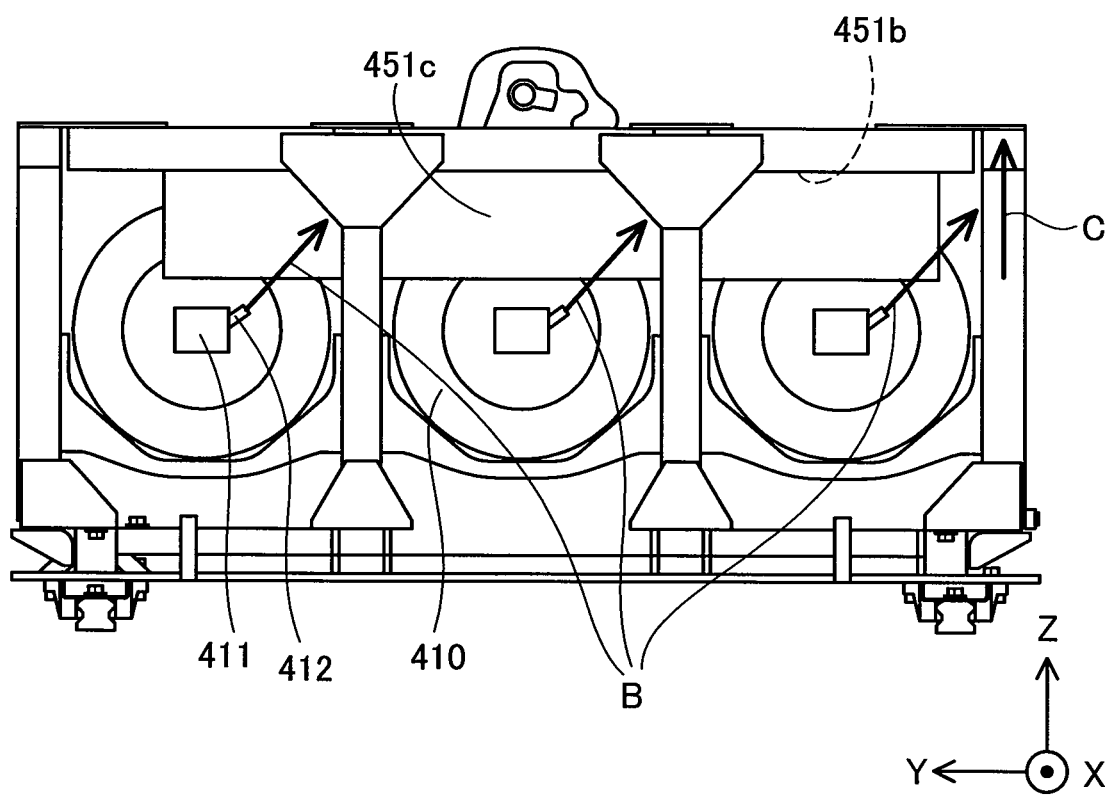
FIG. 11 is an enlarged view of the inside of a broken line frame Q of FIG. 4.
Figure 12:
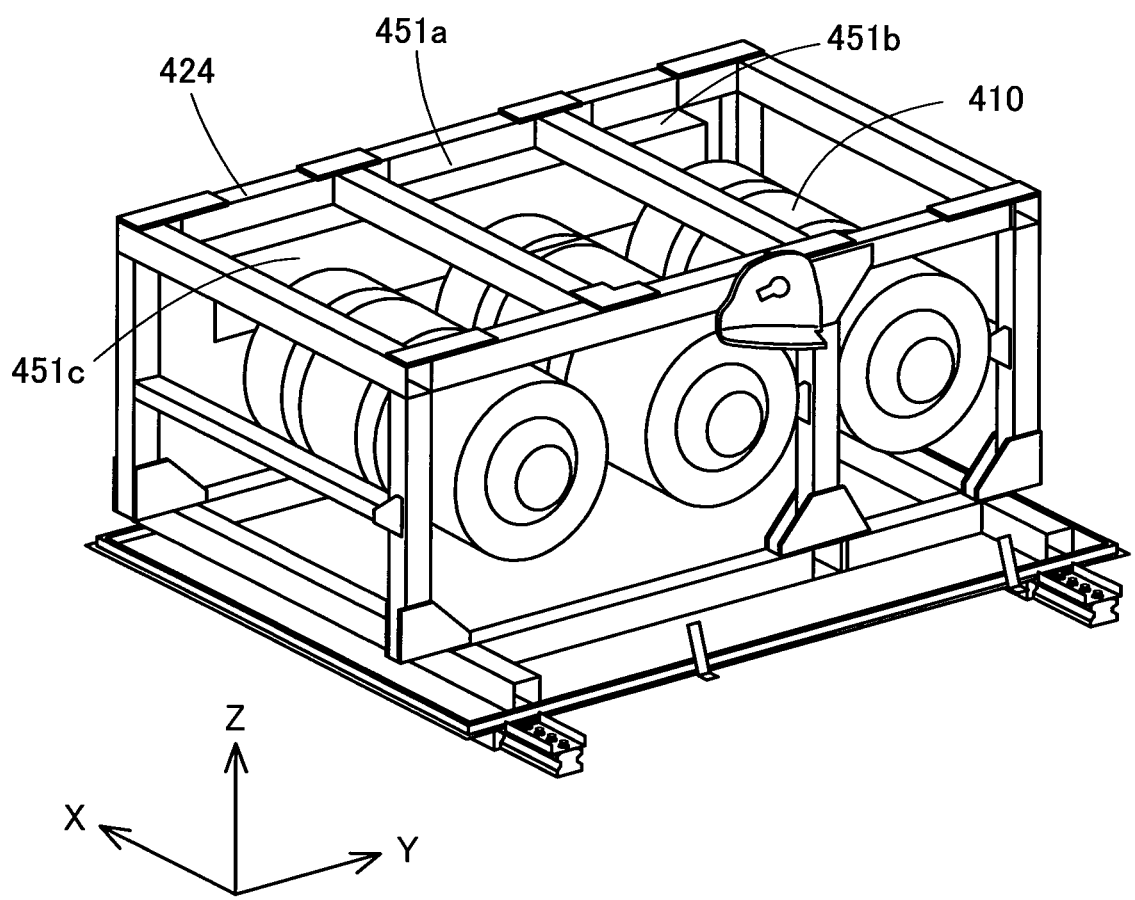
FIG. 12 is a perspective view of a structure shown in FIG. 11.
Figure 13:
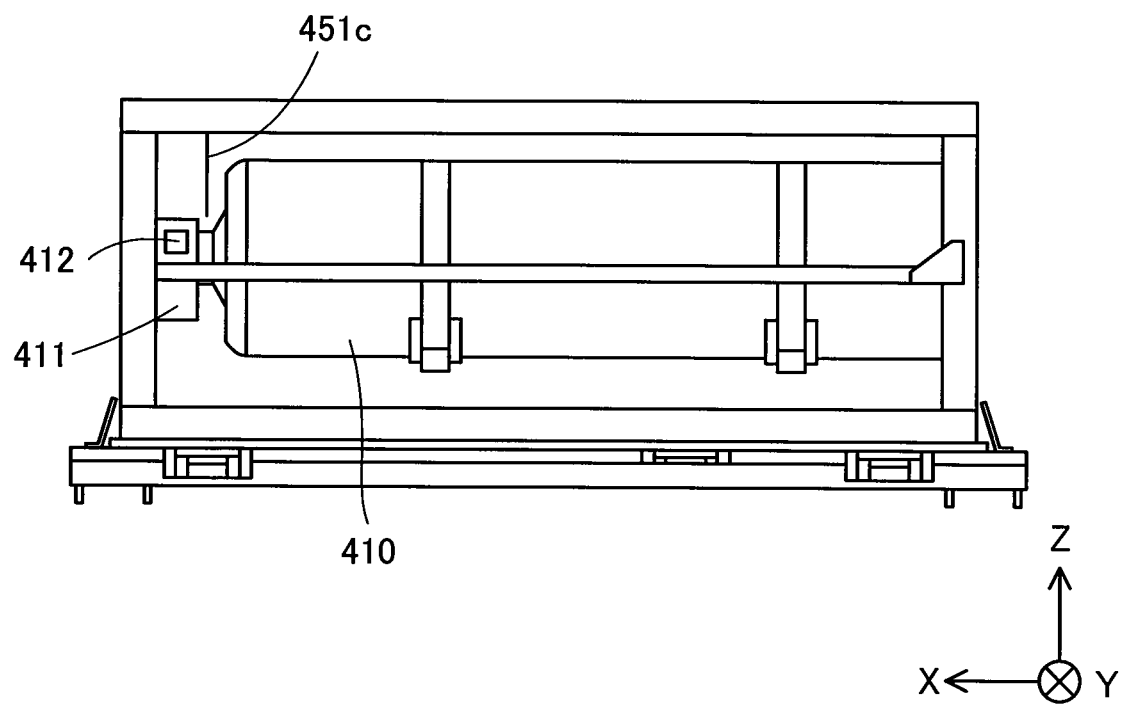
FIG. 13 is a view of the structure shown in FIG. 11 viewed in a positive direction of a Y axis.

FIG. 10 is a perspective view for explaining the fuel gas guide 450. FIG. 11 is an enlarged view of the inside of a broken line frame Q of FIG. 4. FIG. 12 is a perspective view of a structure shown in FIG. 11. FIG. 13 is a view of the structure shown in FIG. 11 viewed in the positive direction of the Y axis. The fuel gas guide 450 will be described with reference to FIGS. 4, 6, and 10 to 13. Note that, in order to facilitate understanding, in FIGS. 11 to 13, a part of the fuel cell vehicle 10 is omitted.

The fuel gas guide 450 regulates the direction in which the hydrogen gas discharged from the safety valve 412 moves. As shown in FIG. 10, the fuel gas guide 450 is constructed from three attachment parts 451a, regulation gas guide 451b, and a leading part 451c. Each of the attachment part 451a, the regulation guide 451b, and the leading part 451c is a plate-shaped member having a rectangular shape. The attachment part 451a, the regulation guide 451b, and the leading part 451c may be formed of a stainless steel, a titanium, and an alloy of these metals, for example, and may be formed using a material such as a carbon fiber or brick.

As shown in FIG. 10, an end portion in a lateral direction of the attachment part 451a connects to an end portion in a lateral direction of the regulation guide 451b. An end portion of the regulation guide 451b opposite from the end portion that has been connected to the attachment part 451a connects to the end portion of the leading part 451c in the lateral direction. The surfaces of the attachment part 451a and the leading part 451c are parallel to the Z axis direction and the Y axis direction. The surface of the regulation guide 451b is parallel to the X axis direction and the Y axis direction. The dimensions of the regulation guide 451b in the Y axis direction and the dimensions of the leading part 451c in the Y axis direction are the same. The dimensions of the attachment part 451a in the Y axis direction are smaller than the dimensions of the regulation guide 451b and the leading part 451c in the Y axis direction. The three attachment parts 451a are connected to the end portion of the regulation guide 451b with intervals in the Y axis direction. The attachment part 451a that is located in the most positive direction side of the Y axis direction has dimensions in the Y axis direction which are smaller than those of the other two attachment parts 451a.

As shown in FIG. 12, in the fuel gas guide 450, the surface of the attachment part 451a on the positive direction side of the X axis contacts with the frame member 424. As shown in FIG. 6, the fuel gas guide 450 is attached to the frame member 424 with a bolt. Therefore, the regulation guide 451b is arranged to be located on the positive direction side of the Z axis direction of the safety valve 412. The fuel gas guide 450 is arranged such that the surface of the regulation guide 451b is parallel to the X axis direction, that is, the floor part 11. In FIGS. 4 and 11 to 13, the bolt is omitted. Note that, as shown in FIG. 4, the fuel gas guide 450 located in the most positive direction side of the Z axis includes the regulation gas guide 451b and the leading part 451c. The surface forming the positive direction side of the Z axis of the casing 420 and the regulation guide 451b are fixed to each other with a bolt (not shown), so that the fuel gas guide 450 located in the most positive direction side of the Z axis is fixed. The fuel gas guide and the casing may be fixed by an adhesive, a tape, for example.

The fuel gas guide 450 is attached to the frame member 424 as described above, so that, as shown in FIG. 13, the leading part 451c defines a space between the cylindrical part of the fuel tank 410 and the cap part 411. As described above, the safety valve 412 is arranged such that the direction in which the hydrogen gas is discharged is between the positive direction of the Z axis and the negative direction of the Y axis. Therefore, as indicated by an arrow B of FIG. 11, the hydrogen gas is discharged from the safety valve 412. Next, when colliding with the regulation guide 451b located on the upper side of the vertical direction, the hydrogen gas is led to the direction indicated by an arrow C. In the present embodiment, the hydrogen gas that has been moved to the vehicle-width direction collides with the leading part 451c to be led to the negative direction side of the Y axis. Therefore, also the hydrogen gas that has been moved not only in the vertical direction, but also in the vehicle-width direction, can be moved to the negative direction side of the Y axis.

Thereafter, the hydrogen gas that has moved along the arrow C is discharged to the outside of the fuel cell vehicle 10 through the duct 300 as indicated by an arrow D of FIG. 4. As described above, the hydrogen gas discharged from the safety valve 412 moves along the regulation guide 451b and the leading part 451c. Therefore, movement from the safety valve 412 to directly above and movement in the vehicle-width direction of the hydrogen gas discharged from the safety valve 412 are prevented, so that the fuel gas can be led to the duct 300 more efficiently.

A2. Second Embodiment

Figure 14:
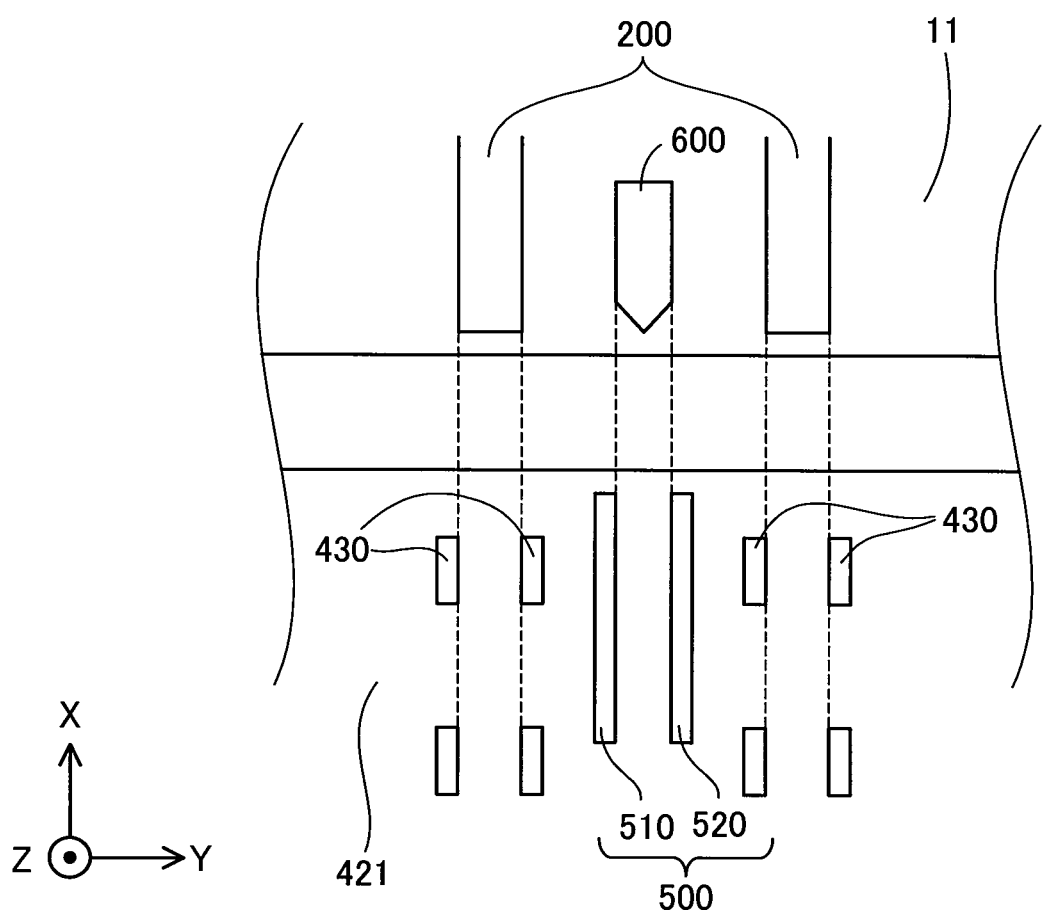
FIG. 14 is a schematic overview for explaining contact between the rail and the block unit in a second embodiment.

FIG. 14 is a schematic overview for explaining contact between the rail 200 and the block unit 430 in a second embodiment. FIG. 14 is a view showing a positional relationship of a receiving member 500 and a guide 600 in a state where the fuel tank module 400 is not accommodated in the fuel cell vehicle 10. The second embodiment is different from the first embodiment in that the receiving member 500 is provided on the bottom surface 421 of the casing 420 and the guide 600 is provided in the floor part 11 of the fuel cell vehicle 10. Other configurations of the fuel cell vehicle 10 in the second embodiment are similar to those of the first embodiment.

As shown in FIG. 14, the bottom surface 421 is provided with a first receiving member 510 and a second receiving member 520 forming the receiving member 500. When the first receiving member 510 and the second receiving member 520 are not distinguished, they are referred to as the receiving member 500. The receiving member 500 has a role of fitting to the guide 600 to position the fuel tank module 400 when the fuel tank module 400 is mounted to the fuel cell vehicle 10.

Each of the first receiving member 510 and the second receiving member 520 has a substantially rectangular parallelepiped shape extending in the X axis direction. The first receiving member 510 and the second receiving member 520 have the same shape, and are formed with an interval in the Y axis direction on the bottom surface 421 of the casing 420. The first receiving member 510 is arranged so as to be located further toward the negative direction side of the Y axis than the second receiving member 520. End portions of the first receiving member 510 and the second receiving member 520 on the positive direction side of the X axis form a space having a constant width with respect to the X axis direction. An end portion of the receiving member 500 on the positive direction side of the X axis is arranged to be located further toward the positive direction side of the X axis than end portions of two block units 430 located on the positive direction side of the X axis, of the four block units 430.

The guide 600 is provided between two rails 200 on the floor part 11. The guide 600 fits to the receiving member 500. The guide 600 has a substantially parallelepiped shape extending in the X axis direction. In the present embodiment, the dimensions of the guide 600 in the Z axis direction and the Y axis direction are substantially the same as the dimensions of the rail 200 in the Z axis direction and the Y axis direction. The dimensions of the guide 600 in the X axis direction are smaller than the dimensions of the rail 200 in the X axis direction.

From among both ends of the guide 600, an end portion on a side which the receiving member 500 approaches when the fuel tank module 400 is mounted to the fuel cell vehicle 10, in other words, an end portion on the negative direction side of the X axis is configured in a convex shape. Specifically, the end portion on a negative direction side of the X axis of the guide 600 is configured such that a width with respect to the Y axis direction becomes larger toward the other end portion. Therefore, even when a relative positional deviation of the guide 600 and the receiving member 500 is larger than a relative positional deviation of the block unit 430 and the rail 200, the guide 600 and the receiving member 500 can fit to each other. That is, the receiving member 500 is easy to fit to the guide 600.

In the present embodiment, a tip end of the end portion of the guide 600 on the negative direction side of the X axis is formed to align with the end portion of the rail 200 on the negative direction side of the X axis in a straight line with respect to the Y axis.

Figure 15:
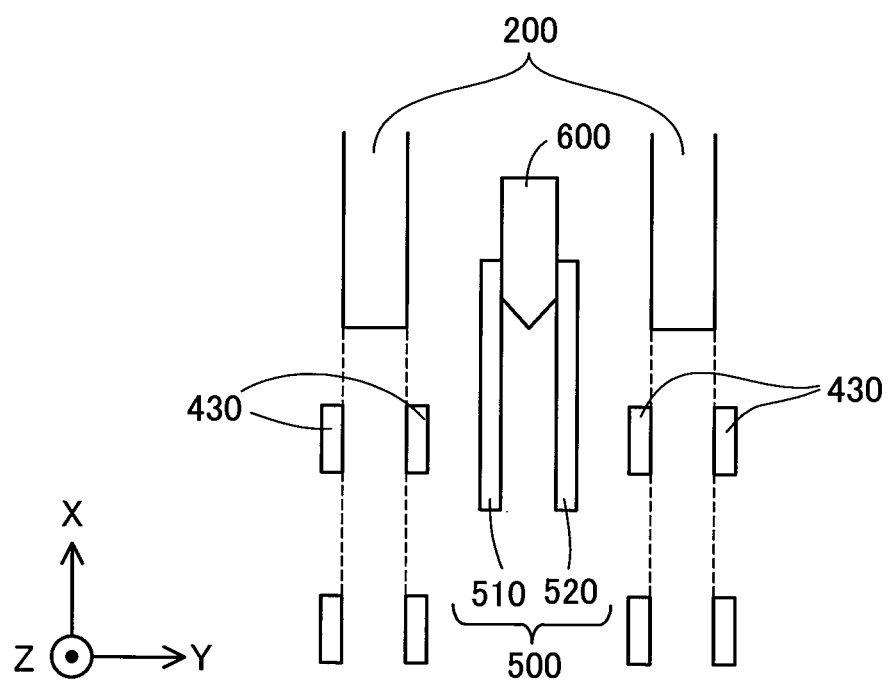
FIG. 15 is a view for explaining a state where a guide and a receiver contact each other.

FIG. 15 is a view for explaining a state where the guide 600 and the receiving member 500 contact each other. As shown in FIG. 15, the end portion of the receiving member 500 on the positive direction side of the X axis can receive the guide 600. As described above, the end portion of the receiving member 500 on the positive direction side of the X axis is formed to project further toward the positive direction side of the X axis than the end portion of the block unit 430. Therefore, when the fuel tank module 400 is mounted to the fuel cell vehicle 10, the guide 600 and the receiving member 500 contact each other before the rail 200 and the block unit 430 contact each other.

Therefore, before the block unit 430 is mounted to the rail 200, the guide 600 and the receiving member 500 fit to each other so that the relative positional deviation of the block unit 430 and the rail 200 is reduced. In a state where the guide 600 and the receiving member 500 fit to each other, as the fuel tank module 400 is moved to a mounting position in the fuel cell vehicle 10, the guide 600 and the receiving member 500 can perform guide so as to reduce the relative positional deviation of the block unit 430 and the rail 200. Therefore, the block unit 430 can be mounted to the rail 200 in a stable state.

The receiving member is also referred to as a receiver.

B. Other Embodiments

B1) In the embodiments described above, two rails 200 are provided in the floor part 11. However, for example, the number of the rails may be an arbitrary number such as one or three. The block unit is provided on the bottom surface of the casing so as to connect to the rail.

B2) In the embodiments described above, the cap part 411 is provided in the end portion on the positive direction side of the X axis direction. However, for example, the cap part may be provided in both ends of the fuel tank.

B3) In the embodiments described above, the safety valve 412 is arranged such that the direction in which the hydrogen gas in the fuel tank 410 is discharged via the safety valve 412 when the safety valve 412 opens is the direction of the duct 300 with respect to the safety valve 412. However, for example, the safety valve may be directed in another direction such that the direction in which the hydrogen gas is discharged via the safety valve is on the positive direction side of the Y axis. Furthermore, the safety valve may be directed in all directions of the duct, or it may be directed in only a part of these.

B4) In the embodiments described above, arrangement is performed such that the surface of the regulation guide 451b is parallel to the floor part 11. However, for example, arrangement may be adopted such that the regulation guide has an angle with respect to the floor part.

B5) In the second embodiment, the dimensions of the guide 600 in the Z axis direction and the Y axis direction are substantially the same as the dimensions of the rail 200 in the Z axis direction and the Y axis direction, and the dimensions in the X axis direction are smaller than the dimensions of the rail in the X axis direction. However, for example, the dimensions of the guide in the Y axis direction may be larger than the dimensions of the rail in the Y axis direction. It is preferable that the guide and the receiver fit to each other.

B6) In the second embodiment described above, the tip end of the end portion of the guide 600 on the negative direction side of the X axis is formed so as to align with the end portion of the rail 200 on the negative direction side of the X axis in a straight line with respect to the Y axis direction, and the end portion of the receiving member on the positive direction side of the X axis is provided so as to project further toward the positive direction side of the X axis than the end portions of two block units 430 located on the positive direction side of the X axis, of the four block units 430. However, for example, the end portion of the guide on the negative direction side of the X axis may be provided so as to be located further toward the negative direction side of the X axis than the end portion of the rail on the negative direction side of the X axis, and the end portion of the receiving member on the positive direction side of the X axis may be provided further toward the negative direction side of the X axis than the end portion of the block unit on the positive direction side of the X axis. It is preferable that the guide and the receiver contact each other before the rail and the block unit contact each other.

B7) In the second embodiment described above, the receiving member 500 includes the first receiving member 510 and the second receiving member 520. However, the receiving member may be one member. It is preferable that the guide and the receiver contact each other before the rail and the block unit contact each other.

B8) In the second embodiment described above, each of the first receiving member 510 and the second receiving member 520 have a substantially rectangular parallelepiped shape extending in the X axis direction. However, for example, the receiving member may have a substantially trapezoidal shape when viewed in the negative direction of the Z axis, and may be configured such that the interval between the first receiving member and the second receiving member in the Y axis direction becomes smaller toward the negative direction of the X axis.

B9) In the embodiments described above, the duct 300 is provided on the negative direction side of the Y axis and the positive direction side of the X axis from the substantial center of the fuel cell vehicle 10. However, for example, the position where the duct is provided may be further toward the positive direction side of the Y axis and the negative direction side of the X axis than substantially the center of the fuel cell vehicle. A hole in the fuel tank module is provided in a position that enables connection with the opening of the duct.

B10) In the embodiments described above, four block units 430 are provided on the bottom surface 421. However, for example, six or eight block units may be provided on the bottom surface.

B11) In the embodiments described above, the fuel gas guide 450 includes the attachment part 451a, the regulation guide 451b, and the leading part 451c. However, for example, the fuel gas guide may include only the regulation guide or may include the attachment part and the regulation guide. Furthermore, the fuel gas guide may include only the leading part.

The disclosure is not limited to any of the embodiment and its modifications described above but may be implemented by a diversity of 35 configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to an aspect of the present disclosure, a fuel cell vehicle is provided. The fuel cell vehicle includes a fuel tank module that accommodates fuel gas, and a rail arranged along a vehicle-width direction of the fuel cell vehicle in a floor part of the fuel cell vehicle, in which the fuel tank module includes: a casing that accommodates a fuel tank accommodating the fuel gas; a block unit arranged in a bottom surface of the casing and configured to be attachable to and detachable from the rail and movable along the rail; and a fixation unit that is configured to fix the block unit to the rail and release fixation of the block unit to the rail. In such an aspect, by moving the fuel tank module on the rail arranged along the vehicle-width direction of the fuel cell vehicle and detaching the fuel tank module from the rail, it is possible to change the fuel tank module easily. Since the rail is provided along the vehicle-width direction of the fuel cell vehicle, at the time of acceleration and deceleration of the fuel cell vehicle, the fuel tank module is less susceptible to inertial force in a direction along the rail. Therefore, as compared to an aspect in which the rail runs along a front and rear direction of the fuel cell vehicle, the fixation unit can be configured with a simple structure.

(2) According to the aspect of the present disclosure, the fuel cell vehicle may further include a duct communicating a space accommodating the fuel tank and the outside of the fuel cell vehicle, the fuel tank may include a safety valve that opens when temperature becomes greater than a predetermined temperature, and the fuel tank may be configured such that a direction in which the fuel gas in the fuel tank is discharged via the safety valve when the safety valve opens is a direction of the duct with respect to the safety valve. In such an aspect, when the safety valve is actuated, the fuel gas can be quickly discharged to the outside of the fuel cell vehicle.

(3) According to the aspect of the present disclosure, the fuel tank module may include a regulation guide that is provided in an upper side of the safety valve in a vertical direction, and that is parallel to the floor part. In such an aspect, when a specific gravity of the fuel gas is less than air, the below effect can be obtained. That is, since the fuel gas discharged from the safety valve moves along the regulation guide, movement of the fuel gas discharged from the safety valve from the safety valve to directly above is prevented, so that the fuel gas can be led to the duct more efficiently.

(4) According to the aspect of the present disclosure, the fuel cell vehicle may further include a guide provided in the floor part, the fuel tank module may have a receiver that fits to the guide when the fuel tank module is mounted to the fuel cell vehicle, and the guide and the receiver may be arranged such that the guide and the receiver contact each other before the rail and the block unit contact each other when the fuel tank module is mounted to the fuel cell vehicle. In such an aspect, before the block unit is connected to the rail, the guide and the receiver contact each other to fit with each other. Therefore, thereafter, the block unit can be mounted to the rail in a stable state.

(5) According to an aspect of the present disclosure, the guide includes an end portion on a side which the receiver approaches when the fuel tank module is mounted to the fuel cell vehicle, wherein the end portion may be provided in a convex shape. In such an aspect, the receiver is easy to fit to the guide.

What is claimed is:

1. A fuel cell vehicle comprising:
a fuel tank module that accommodates a fuel gas; and
a rail arranged along a vehicle-width direction of the fuel cell vehicle in a floor of the fuel cell vehicle,
wherein the fuel tank module includes:
a casing that accommodates a fuel tank accommodating the fuel gas;
a block unit arranged in a bottom surface of the casing and configured to be attachable to and detachable from the rail and movable along the rail; and
a fixation unit that is configured to fix the block unit to the rail and release fixation of the block unit to the rail.

2. The fuel cell vehicle according to claim 1,
further comprising a duct communicating a space accommodating the fuel tank and an outside of the fuel cell vehicle,
wherein the fuel tank includes a safety valve that opens when temperature becomes greater than a predetermined temperature, and the fuel tank is configured such that a direction in which the fuel gas in the fuel tank is discharged via the safety valve when the safety valve opens is a direction of the duct with respect to the safety valve.

3. The fuel cell vehicle according to claim 2,
wherein the fuel tank module includes a regulation guide that is provided in an upper side of the safety valve in a vertical direction, and is parallel to the floor part.

4. The fuel cell vehicle according to claim 1,
further comprising a guide provided in the floor,
wherein the fuel tank module has a receiver that fits to the guide when the fuel tank module is mounted to the fuel cell vehicle, and
the guide and the receiver are arranged such that the guide and the receiver contact each other before the rail and the block unit contact each other when the fuel tank module is mounted to the fuel cell vehicle.

5. The fuel cell vehicle according to claim 4,
wherein the guide includes an end portion on a side which the receiver approaches when the fuel tank module is mounted to the fuel cell vehicle, wherein the end portion is provided in a convex shape.

* * * * *